United States Patent
Allison et al.

(10) Patent No.: US 12,097,722 B2
(45) Date of Patent: *Sep. 24, 2024

(54) ERASABLE WRITING COMPOSITIONS

(71) Applicant: Crayola LLC, Easton, PA (US)

(72) Inventors: Keith Allison, Blandon, PA (US); Victor Hugo Bedoya, Easton, PA (US)

(73) Assignee: Crayola LLC, Easton, PA (US)

( * ) Notice: Subject to any disclaimer, the term of this patent is extended or adjusted under 35 U.S.C. 154(b) by 731 days.

This patent is subject to a terminal disclaimer.

(21) Appl. No.: 16/472,525

(22) PCT Filed: Dec. 14, 2017

(86) PCT No.: PCT/US2017/066397
§ 371 (c)(1),
(2) Date: Jun. 21, 2019

(87) PCT Pub. No.: WO2018/118640
PCT Pub. Date: Jun. 28, 2018

(65) Prior Publication Data
US 2021/0129576 A1      May 6, 2021

Related U.S. Application Data

(60) Provisional application No. 62/438,270, filed on Dec. 22, 2016, provisional application No. 62/515,823, filed on Jun. 6, 2017.

(51) Int. Cl.
*C09D 13/00* (2006.01)
*B43K 19/02* (2006.01)
*C09D 11/17* (2014.01)

(52) U.S. Cl.
CPC .............. *B43K 19/02* (2013.01); *C09D 11/17* (2013.01); *C09D 13/00* (2013.01)

(58) Field of Classification Search
None
See application file for complete search history.

(56) References Cited

U.S. PATENT DOCUMENTS

| | | | |
|---|---|---|---|
| 3,409,574 A | 11/1968 | Gros | |
| 3,702,314 A | 11/1972 | Farjon et al. | |
| 4,978,390 A | 12/1990 | Snedeker | |
| 5,055,498 A * | 10/1991 | Brachman | C09D 13/00 524/400 |
| 5,318,622 A | 6/1994 | Kitazawa et al. | |
| 5,417,746 A | 5/1995 | Cheng | |
| 5,595,589 A | 1/1997 | Hoshiba et al. | |
| 6,011,084 A | 1/2000 | Leidner et al. | |
| 6,056,810 A | 5/2000 | Lugert | |
| 6,262,143 B1 | 7/2001 | Leidner et al. | |
| 6,271,286 B1 | 8/2001 | Leidner et al. | |
| 6,395,076 B1 | 5/2002 | Hashimoto | |
| 6,552,110 B1 | 4/2003 | Yalvac et al. | |
| 6,662,515 B2 * | 12/2003 | Buhrts | E04H 17/20 52/301 |
| 6,663,704 B2 | 12/2003 | Spencer et al. | |
| 6,815,471 B2 | 11/2004 | Leidner et al. | |
| 6,875,261 B2 | 4/2005 | Hashimoto et al. | |
| 9,090,784 B2 | 7/2015 | Kitazawa et al. | |
| 10,711,150 B2 * | 7/2020 | Allison | C09D 191/06 |
| 2002/0025995 A1 | 2/2002 | Leidner et al. | |
| 2013/0338257 A1 | 12/2013 | Liu | |

FOREIGN PATENT DOCUMENTS

| CA | 2292467 C * | 1/2008 |
| CA | 2333071 C * | 8/2008 |
| DE | 20200809751 U1 * | 8/2009 |
| JP | 0236281 A | 2/1990 |
| JP | 2011184646 A * | 9/2011 |

OTHER PUBLICATIONS

International Preliminary Report on Patentability for International Application No. PCT/US2017/066397, dated Jun. 25, 2019—8 pages.
International Search Report and Written Opinion for International Application No. PCT/US2017/066397, dated Mar. 22, 2018—8 pages.

* cited by examiner

*Primary Examiner* — Tae H Yoon
(74) *Attorney, Agent, or Firm* — Buchanan Ingersoll & Rooney PC

(57) ABSTRACT

A thermoplastic writing composition includes at least one particulate filler including one or more of days, silicates, or carbonates, at least one thermoplastic binder material including one or more of high density polyethylene, polypropylene, and styrene, one or more waxes chosen from soy wax, paraffin wax, and beeswax, at least one colorant, and optionally, at least one surfactant.

28 Claims, No Drawings

ERASABLE WRITING COMPOSITIONS

CROSS-REFERENCE TO RELATED APPLICATIONS

This application is the U.S. national phase of international application no. PCT/US2017/0 66397, filed Dec. 14, 2017, which claims priority under 35 U.S.C. § 119(e) to U.S. provisional patent application no. 62/438,270, filed Dec. 22, 2016 and U.S. provisional application no. 62/515,823, filed Jun. 6, 2017, the disclosures of each of which applications are hereby incorporated herein by reference in their entireties.

FIELD OF THE INVENTION

The present invention relates generally to thermoplastic writing compositions and writing instruments produced from the thermoplastic writing compositions. More specifically, the present invention relates to erasable colored writing compositions and erasable colored writing instruments having increased color vibrancy, improved laydown characteristics, and sufficient resistance to breakage such that supportive sheaths are not necessary. Also, the compositions are sufficiently resistant to breakage such that they may be formed into thin mechanical pencil cores. The compositions are capable of being extruded or injection molded into writing instruments of various shapes and thicknesses.

BACKGROUND OF THE INVENTION

Art materials for the entertainment and developmental benefit of children are well-known. For example, drawing and coloring materials, such as pencils, mechanical pencils, and crayons, are typically given to children to produce artwork and to stimulate the children's creativity and imagination. To contribute to a pleasant use experience by children, colored pencil cores and crayons must be capable of smooth laydown, high intensity/vibrancy of the colored markings, sufficient break strength, and sufficient bending capability. Other beneficial characteristics of colored pencil cores are erasability and resistance to smearing.

Attempts to produce colored pencils having high vibrancy and properties of erasability have involved blending a mixture of a pigment, one or more fillers, and a wax (e.g., a low melting wax). Though these approaches produced colored pencil core compositions with high color vibrancy, complete removal of marks produced by these compositions with standard erasers has not been achieved. Erased regions may be left with a smeared appearance. It is believed that the shear forces generated during marking of a surface with the colored pencil compositions are sufficient to heat the wax components such that the wax gains fluidity. Frictional forces are also imposed on the compositions during the act of erasing the marks, which also may impose fluidity on the wax components. The fluidity allows the wax to penetrate into, for example, paper fibers of a paper marked with the colored pencil compositions. Additionally, the fluid nature of the wax allows portions of the marks made with the composition to be moved around on the surface of the marked substrate (e.g., paper, cardboard), which causes smearing.

Attempts have been made to improve the smearing and erasability of colored pencil cores. One approach was to reduce the amount of wax in colored pencil compositions, which produced very hard pencil cores with poor laydown characteristics. Other approaches have attempted to use an oil instead of a wax to maintain color vibrancy, which can increase manufacturing complexity and cost, as well as still contributed to smearing and smudging.

Colored pencil core compositions have been developed that address the problems demonstrated by these approaches; i.e., the compositions can be erased using standard pencil erasers without significant smearing and they exhibit relatively high color vibrancy. For example, commercially available colored pencils, which are described in U.S. Patent Nos. 6,262,143, 6,271,286, 6,815,471, and 6,011,084, provide core compositions for colored pencils capable of erasure using standard pencil erasers.

However, one drawback of the core compositions used in these colored pencils is that the colored marks resulting from the core compositions, while exhibiting high vibrancy on lighter-colored substrates, do not exhibit high vibrancy or opacity on darker substrates (e.g., dark cardboard or dark construction paper). Moreover, it is difficult to build layers of colored marks on substrates without causing self-erasure, i.e., the removal or smearing of a colored mark by placing a new mark on top of it. Such self-erasure diminishes the vibrancy of marks made with the core compositions of these colored pencils, and interferes with smooth laydown properties. Several of these compositions susceptible to self-erasure include fibrous materials; it was believed the fibrous material was necessary to impart erasability to the compositions. Such compositions exhibited increased erasability, but had poorer laydown qualities as a result.

Another problem exhibited by the available colored pencil core compositions is that they have a low break strength and must be sheathed as cores within a rigid material such as wood or hard plastic to be used appropriately. These colored pencil cores are typically not strong enough to withstand use without a supportive material, such as wood or hard plastic, surrounding them. Moreover, the process required to sheathe these cores within supportive materials to make the colored pencils is complicated, time-consuming, and costly. Low break strength also discourages uses of such available colored pencil core compositions in mechanical pencils, as the cores used within the mechanical pencils must have very narrow cross-sections (e.g., only a few millimeters).

Even crayons, which are typically not sheathed with highly rigid materials such as hard plastic or wood, may require some supportive material to withstand prolonged use and to avoid breakage. Crayons often are sheathed in paper labels, wherein the paper label is wrapped multiple times around the crayon to add a strong outer supportive layer. The process of wrapping crayons, much like the process of sheathing colored pencil cores, is costly and time-consuming.

Another problem with available colored pencil core and crayon compositions is that they lack versatility with respect to the process by which the cores for the pencil are produced; that is, they must often be produced via an inefficient injection molding process. The cores and crayons cannot be mechanically extruded instead, which extrusion increases efficiency of production.

Thus, there exists a need for erasable colored writing compositions and writing instruments that are versatile such that they may be injection molded or efficiently extruded, and are resistant to breakage under the stress of use such that supportive sheaths surrounding the writing instruments are unnecessary and the compositions may be formed into mechanical pencil cores. There further exists a need for colored writing compositions having smooth laydown characteristics such that they resist self-erasure when colored marks are layered or built upon one another. Moreover, there further exists a need for colored writing compositions having high color vibrancy such that colored marks made with the compositions exhibit high opacity on dark substrates.

SUMMARY OF THE INVENTION

An embodiment of the present invention provides compositions for colored writing instruments. The colored writing compositions comprise at least one particulate filler, at least one thermoplastic material, one or more waxes, at least one colorant, and, optionally, at least one surfactant. In exemplary embodiments, the at least one particulate filler is a clay (e.g., kaolin clay), and the thermoplastic material is a plastic (e.g., high-density polyethylene, "HDPE").

The writing compositions are erasable, i.e., can be substantially removed without significant smearing from a given substrate with standard pencil erasers, and are thermoplastic, i.e., capable of being extruded or injection molded, but are solid at room temperature. Additionally, the compositions and writing instruments produced from the compositions have a high resistance to breakage such that they can be used to apply colored marks to surfaces of substrates (e.g., paper, cardboard) without supportive sheaths to resist breakage. The compositions may also be used to produce very narrow mechanical pencil cores that maintain their resistance to breakage. The writing compositions also display improved color vibrancy (i.e., are substantially visible and opaque against dark substrates) and exhibit smooth laydown of colored marks when applied to a substrate's surface (i.e., the colored marks resist self-erasure when the core compositions are layered or built upon each other).

DETAILED DESCRIPTION OF THE INVENTION

The present invention relates to colored writing compositions and colored writing instruments made from the compositions. It has been surprisingly found that the writing instruments resulting from the compositions according to the present invention are capable of being produced by versatile processes, such as via extrusion and/or injection molding. The writing instruments may be injection molded or extruded into any shape, including into shapes of crayons, mechanical pencil cores, or pencil cores. Additionally, the colored writing compositions exhibit high strength characteristics and are break resistant such that writing instruments prepared from the compositions can be used without being sheathed in support materials, e.g., wood, plastic, or paper, or can be formed into very narrow mechanical pencil cores. The breaking strength and bending strength of the writing compositions are therefore highly improved. Such qualities decrease production time and production costs of writing instruments prepared from the compositions.

It has also been surprisingly found that the compositions display improved laydown qualities, which result in increased color vibrancy and opacity when the compositions are applied to dark substrates. This also results in resistance to self-erasure when marks from the compositions are layered, or built, upon one another during use. Thus, the compositions allow for building of layers of colored marks during use.

The writing compositions comprise at least one particulate filler, at least one thermoplastic material, one or more waxes, at least one colorant, and, optionally, at least one surfactant. It has also been surprisingly found that the marks made by the colored writing compositions are easily erasable with standard, ordinary pencil erasers without leaving behind substantial residue or smears, despite their wax content and lack of fibrous materials.

The writing compositions of the present invention include at least one binder material to provide integrity to the compositions by holding the components of the compositions together. Preferably, the binder is an extrudable, thermoplastic material (e.g., high density polyethylene, polypropylene, polystyrene), such that the colored pencil compositions are capable of being extruded when exposed to heat in an extrusion process, but are solid at room temperature. Most preferably, the binder material is a high density polyethylene (HDPE).

The binder material (e.g., HDPE) may be present in any suitable amount in the compositions. Preferably, the binder material is present in an amount between about 10% and about 36% by weight of the composition. More preferably, the binder material is present in an amount between about 11% and about 21% by weight. Even more preferably, the binder material is present in an amount of about 16% by weight.

The writing compositions include at least one suitable colorant, such as a dry pigment. The pigment may be organic or inorganic. Colorants (e.g., pigments) producing specific visual effects, such as pearlescent pigments, may be used. Pigments predispersed in thermoplastic materials, such as pigment predispersed in HDPE, may optionally be used.

The colorant can be present in the compositions in any suitable amount. Preferably, the colorant is present from about 1% to about 30% by weight of the composition. More preferably, the colorant is present from about 5% to about 15% by weight of the composition. Even more preferably, the colorant is present in an amount of about 10% by weight of the composition.

The compositions according to embodiments of the present invention also include at least one suitable particulate filler. The filler may provide stiffness and strength to the writing compositions to resist bending and breaking when formed into various shapes. The filler may also aid in reducing the amount of colorant required in the composition by more efficiently distributing colorant throughout the composition. Suitable fillers may include clays, carbonates, and silicates. Preferably, the fillers comprise clays, due to low cost and desirable absorbance qualities; i.e., it is believed the clays absorb and disperse colorant efficiently to reduce the amount of colorant necessary in the composition. Preferably, the filler is a clay chosen from a group including China clay, T-clay, and kaolin clay. Most preferably, the filler comprises kaolin clay. Additionally, preferable fillers include silicates (e.g., mica) due to their ability to impart strength and rigidity to the composition. The compositions of the present invention may include one or more fillers in any suitable amount. Preferably, the one or more fillers (e.g., kaolin clay, mica) are present in an amount between about 20% and 80% by weight of the composition. More preferably, the one or more fillers are present in an amount between about 50% and 64% by weight. Even more preferably, the one or more fillers are present in an amount of about 58% by weight.

The writing compositions of the present invention also include at least one wax (e.g., soy wax, paraffin wax, beeswax). The wax may contribute to improved color intensity of the compositions and smooth laydown properties. The waxes preferably have amorphous characteristics and lower melting temperatures to provide fluid writing properties when the compositions are used to make colored marks.

The wax may be present in any suitable amount. A wax or a combination of waxes is preferably included in an amount between 2% and about 35% by weight of the composition. Preferably, the compositions include both soy wax and paraffin wax. Preferably, soy wax is included in an amount of between about 1% and about 27% by weight of the composition. More preferably, the soy wax is present in an amount of between about 2% and about 12% by weight. Even more preferably, the soy wax is present in an amount of about 7% by weight. Preferably, paraffin wax is present in an amount between about 1% and about 26% by weight. More preferably, paraffin wax is present in an amount between about 1% and about 11% by weight. Even more preferably, paraffin wax is present in an amount of about 6% by weight of the composition.

Surfactants for stabilizing the compositions and the colorants in the compositions of the present invention and improving processing of the compositions may optionally be included. Examples of surfactants that may be used include colorant dispersants and process aids. Dispersants may prevent colorant, such as pigment, from adhering to itself such that the dispersant aids in mixing the colorant adequately into the composition. Other surfactants include process aids that improve flow properties for processing, such that the composition can easily move through mechanical processing such as extrusion or injection molding.

Surfactants may be present in any suitable amount in the compositions. The compositions may not include surfactants at all, as surfactants are optional. Preferably, surfactants are present in an amount between about 1% and about 10% by weight of the composition. More preferably, surfactants are present in an amount between about 1% and about 6% by weight. Even more preferably, surfactants are present in an amount of about 3% by weight.

The compositions produced according to embodiments of the invention set forth herein may also be formed into different shapes, including into colored pencil core shapes or into crayon shapes, by a variety of processes; that is, the compositions are versatile with respect to their processing capability. For example, the compositions may be injection molded into colored pencil cores, mechanical pencil cores, or crayons. The compositions may also be processed into, for example, colored pencil cores or mechanical pencil cores via profile extrusion, which is more efficient in terms of time and cost than injection molding. The compositions may be formed into any shape suitable for a writing instrument via injection molding and/or extrusion. The compositions may also be formed into cores having any cross-sectional thickness suitable for use with a mechanical pencil (e.g., between approximately 1 mm and 10 mm). Despite the differences in these processing techniques, the compositions according to embodiments of the invention herein are suitable for either technique and produce writing instruments having the same desirable properties.

Pencil cores and/or crayons produced from the compositions according to embodiments of the invention herein are resistant to breakage and do not require supportive sheathing to prevent breakage during use, unlike typical crayons and pencil cores. The cores/crayons may therefore be used to produce colored marks on substrates without any supportive cover. Optionally, a very thin coating layer of thermoplastic material (e.g., HDPE or the thermoplastic filler material used in the composition) may be added to the outside of the cores/crayons to "lock" the surface, such a layer being too thin to provide significant structural support. This thin coating layer of thermoplastic material on the surface of the cores prevents "blooming," wherein waxes and colorants leach through to the surface of the cores/crayons. The thin coating layer of thermoplastic material may also add an aesthetic "shine" to the cores, without impeding ability to sharpen the core for use.

Mechanical pencil cores produced from the compositions according to embodiments of the invention herein are also resistant to breakage and can assume very narrow cross-sectional thicknesses suitable for use with mechanical pencils (e.g., between approximately 1 mm and 10 mm). The compositions of the present invention for producing mechanical pencil cores may include one or more fillers in any suitable amount. Preferably, the one or more fillers (e.g., kaolin clay and/or mica) are present in an amount between about 20% and 50% by weight of the composition. More preferably, the one or more fillers are present in an amount between about 30% and 40% by weight. Even more preferably, the one or more fillers are present in an amount of about 35% by weight. Preferably, compositions of the present invention for producing mechanical pencil cores include both clays (e.g., kaolin clay) and silicates (e.g., mica). Even more preferably, the clays are present in an amount between about 15% and 35% by weight; and the silicates are present in an amount between about 5% and 15% by weight.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A thermoplastic writing composition comprising :
    50% to 64% by weight of at least one particulate filler including one or more of clays, silicates, or carbonates,
    at least one thermoplastic binder material including one or more of high density polyethylene or polypropylene,
    at least 6% by weight of one or more waxes chosen from a group consisting of soy wax, paraffin wax, and beeswax, and
    at least one colorant; and
    wherein the composition is configured to be erasable with a standard pencil eraser after application to a paper or cardboard substrate.

2. The thermoplastic writing composition of claim 1, wherein the at least one particulate filler is a clay.

3. The thermoplastic writing composition of claim 2, wherein the clay is kaolin clay.

4. The thermoplastic writing composition of claim 1, wherein the at least one thermoplastic binder material is the high density polyethylene.

5. The thermoplastic writing composition of claim 1, wherein:
    the at least one thermoplastic binder material is present in an amount between about 10% and about 36% by weight;
    the one or more waxes are present in an amount between about 6% and about 35% by weight; and
    the at least one colorant is present in an amount between about 1% and about 30% by weight.

6. The thermoplastic writing composition of claim 5, wherein at least one surfactant is present in an amount between about 1% and about 10% by weight.

7. The thermoplastic writing composition of claim 1, wherein the at least one colorant is dry pigment.

8. The thermoplastic writing composition of claim 1, wherein the at least one colorant is a pigment predispersed in a thermoplastic material.

9. A writing instrument comprising the thermoplastic writing composition according to claim 1.

10. The writing instrument of claim 9, wherein the writing instrument was produced via an extrusion process.

11. The writing instrument of claim 9, wherein the writing instrument was produced via an injection molding process.

12. The writing instrument of claim 9, wherein a coating layer of a thermoplastic material is applied to a surface of the writing instrument.

13. The writing instrument of claim 9, wherein the writing instrument is in a pencil core shape.

14. The writing instrument of claim 13, wherein the pencil core is encased within a sheath.

15. The writing instrument of claim 14, wherein the sheath is rigid.

16. The writing instrument of claim 15, wherein the sheath is wood or plastic.

17. The writing instrument of claim 9, wherein the writing instrument is in a crayon shape.

18. The writing instrument of claim 17, wherein the writing instrument is encased within a paper sheath.

19. The thermoplastic writing composition of claim 1, wherein:
the at least one thermoplastic binder material is present in an amount between about 10% and about 36% by weight;
the one or more waxes are present in an amount between about 6% and about 35% by weight;
the at least one colorant is present in an amount between about 1% and about 30% by weight, and
and the at least one particulate filler includes one or more clays and one or more silicates.

20. The thermoplastic writing composition of claim 19, wherein the one or more clays include kaolin clay.

21. The thermoplastic writing composition of claim 19, wherein the one or more silicates include mica.

22. The thermoplastic writing composition of claim 19, wherein the one or more clays are present in an amount between about 15% and 35% by weight.

23. The thermoplastic writing composition of claim 22, wherein the one or more clays are present in an amount between about 20% and 30% by weight.

24. The thermoplastic writing composition of claim 19, wherein the one or more silicates are present in an amount between about 5% and 15% by weight.

25. The thermoplastic writing composition of claim 24, wherein the one or more silicates are present in an amount of 10% by weight.

26. A writing instrument comprising the thermoplastic writing composition according to claim 19.

27. The writing instrument of claim 26, wherein the writing instrument is in a pencil core shape.

28. The writing instrument of claim 27, wherein the writing instrument has a cross-section between about 1 mm and 10 mm.

* * * * *